United States Patent [19]

Callicoatte

[11] 4,239,062
[45] Dec. 16, 1980

[54] METHOD AND APPARATUS FOR PROTECTING PIPE THREADS

[75] Inventor: Jerry D. Callicoatte, Midland, Tex.

[73] Assignee: Texas Plastics Industries, Inc., Midland, Tex.

[21] Appl. No.: 19,115

[22] Filed: Mar. 9, 1979

Related U.S. Application Data

[63] Continuation-in-part of Ser. No. 888,169, Mar. 20, 1978, abandoned.

[51] Int. Cl.³ .............................................. B65D 59/06
[52] U.S. Cl. .................................................. 138/96 R
[58] Field of Search ............. 138/96 T, 96 R; 16/108, 16/2

[56] References Cited

U.S. PATENT DOCUMENTS

| | | | |
|---|---|---|---|
| 2,551,834 | 5/1951 | Ferguson | 138/96 T |
| 2,632,479 | 3/1953 | Pfeil | 16/108 |
| 3,104,681 | 9/1963 | Gray | 138/96 R |

Primary Examiner—Lenard A. Footland
Attorney, Agent, or Firm—Wendell Coffee

[57] ABSTRACT

A pipe thread connector of resilient deformable material has a sleeve or tubular shape with radial ribs projecting from the sleeve. The protector is driven upon the threads of the pipe and the geometric configuration of the sleeve changes because the sleeve is bent between the ribs. This bending keeps the ribs in tight resilient contact with the threads.

17 Claims, 13 Drawing Figures

U.S. Patent  Dec. 16, 1980  Sheet 1 of 3  4,239,062
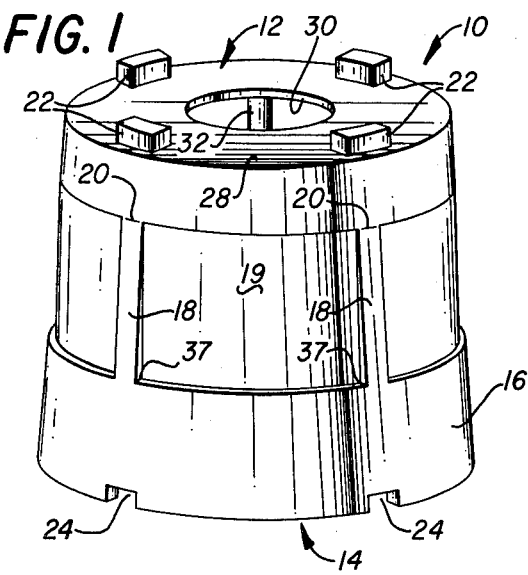
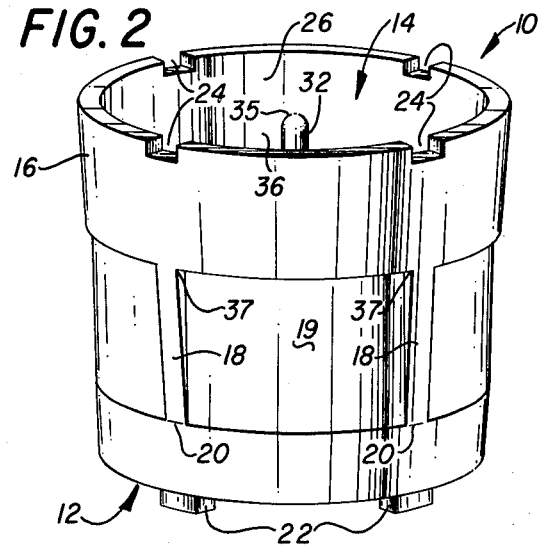
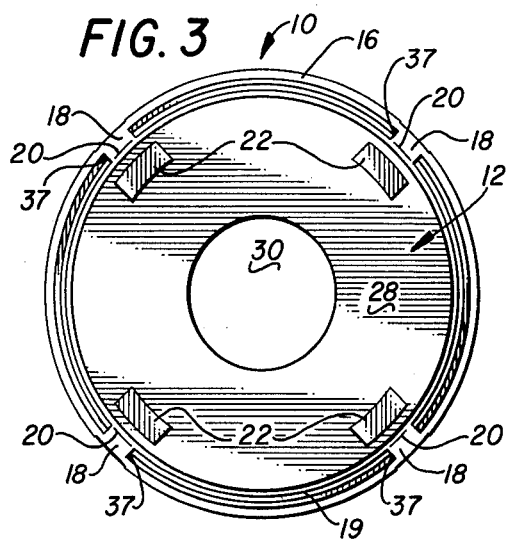
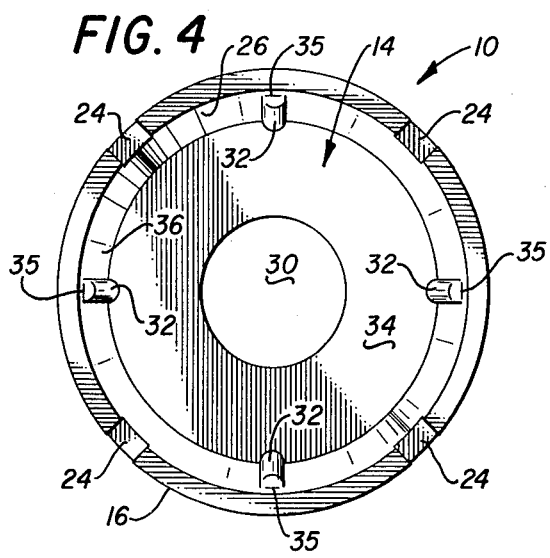
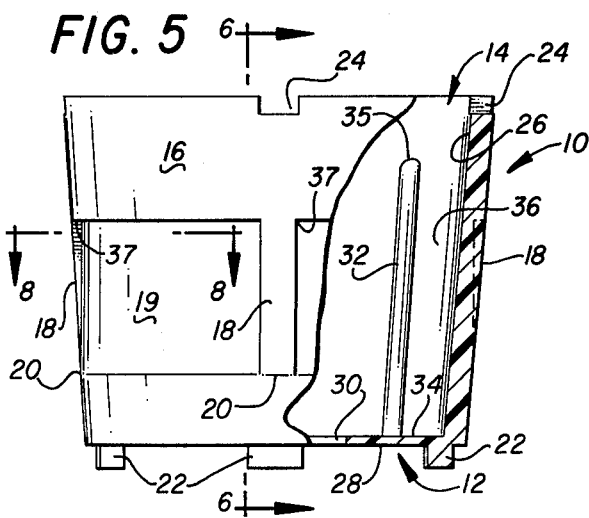
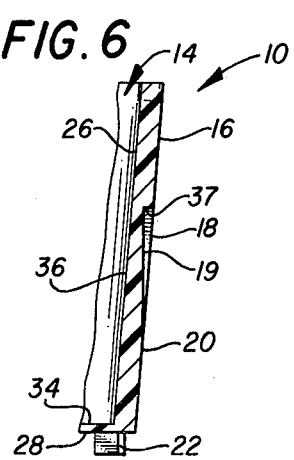

METHOD AND APPARATUS FOR PROTECTING PIPE THREADS

CROSS REFERENCE TO RELATED APPLICATIONS

This application is a continuation-in-part of my previously filed application, filed Mar. 20, 1978, Ser. No. 888,169, now abandoned.

BACKGROUND OF THE INVENTION (1) Field of the Invention

This invention relates to pipes and more particularly to plastic protectors for the threaded end of pipe.

(2) Description of the Prior Art

Tubular goods, such as oil field production pipe, is very expensive and is handled in large quantities. One oil well may require more than four hundred joints of thirty foot pipe. The joints usually are stored out of doors where they are subjected to the deleterious effects of the atmosphere. The threaded ends of a pipe are especially susceptible to oxidation and must be suitably protected.

In handling pipe joints, it is customary to place protectors onto the threaded marginal ends thereof, with one protector being utilized on the pin end and another different size protector being employed on the box end of the pipe.

The protectors usually are screwed into threaded relationship respective to the threaded marginal ends of the pipe, and sometime changes in climatic conditions causes the protectors to become firmly engaged with the pipe threads so that it is very difficult to subsequently remove the protector from the end of the pipe. At other times temperature changes cause the protectos to loosen so that it easily becomes disengaged from the end of the pipe. Moreover, many protectors are provided with an irregular outer surface area so that as one pipe joint makes rolling contact with another, the protectors will inadvertently be unscrewed from the pipe.

There are two main problems with plastic protectors for pipe, particularly oil field pipe. One, the difference in temperature expansion between plastic and steel, and two, the rough handling.

The plastic has thermal expansion which greatly exceeds that of steel. Furthermore, the plastic when warm is soft and more deformable wherein at cold temperatures it is less deformable and more brittle.

The plastic thread protectors may be applied either in hot or cold climates. If they are applied in hot climates, they will contract in cold climates which may cause the protectors to crack and break. If they are applied in cold climates when they warm up and expand if they are on the outside of the threads they may expand to an extent that they are loose.

It will be understood that the temperatures can be extreme, they range all the way from the tropics and desert climates where the pipe sitting in the sun reaches extremely high temperatures or it may be in the artic wherein the pipe goes to extrememly cold temperatures. In the sunshine with the sun shining on the pipe, the pipe can often reach temperatures above 160° F. (72° C.) while in the artic the pipe temperature can be below −60° F. (−50° C.).

Due to the rough handling of the pipe, the external thread protector can be impacted which may either cause cracking of the thread protector if it is cold and brittle; when it will also have greater tensile stresses upon it. If the protector ever cracks it will be loose and will be susceptible to coming off in the event of further vibrations. If the temperature is warm, the rough handling will cause greater deformation of the threads into the thread protector. This impact upon the thread protector will cause the threads to make greater indentations into the thread protector, which further vibrations or rough handling can cause it to come loose.

Joints of pipe are available in many different diameters and it is, therefore, necessary for the manufacturer of the thread protector to supply two different size protectors (internal and external) for each size of pipe. This represents a large capital investment in manufacturing facilities and stock.

Accordingly, it is desirable to be able to reduce the number of protectors required for a finite number of pipe joints. Furthermore, it is desirable to provide a protector which does not loosen nor tighten an appreciable amount during ambient changes in temperature. Moreover, it is desirable to provide a protector which is low in cost, easily installed and removed from the threaded ends of the pipe, and which does not inadvertently become unscrewed during the handling of the pipe. Such a protector is the subject of this invention.

Also in many cases where the pipe is coated internally, it is desired to seal the ends of the pipe to protect the coating and not leave it exposed.

In the parent application, the Examiner considered the following patents to be pertinent:
Gray, Jr., U.S. Pat. No. 3,104,681
Ferguson, U.S. Pat. No. 2,551,834
Pfeil et al., U.S. Pat. No. 2,632,479

GRAY JR. disclose a plastic closure for protecting pipe threads. It discloses a tapered plug. The thread engaging portions of it are smooth, both internally and externally.

FERGUSON discloses a protective plastic cap made of vinylite, cellulose acetate, cellulose acetate butyrate or the like. If is disclosed for use with machine type threads, i.e., non-tapered threads. The entire description of the gripping action is by the deformation of the threads into the ribs.

PFEIL ET AL. discloses a thread protector which has ribs or protuberances 12 of perferable triangular shape which are softer than the threads to be protected.

SUMMARY OF THE INVENTION (1) New and Different Function

According to my invention, the tension upon the thread protector or the force by which the thread protector is held upon the threads is greater than mere stretching. I.e., the material between the ribs is bent so that it becomes a different geometric shape. Therefore, the resilience and the movement due to temperature changes or due to other items, such as rough handling, which would tend to loosen this is taken up by the greater ability to return to its original shape because of the change in geometric form. I.e., the thread protector between the ribs bends rather than just retaining its original shape and stretching.

It will be understood that if the protectors are applied in cold weather, and they are the outside protectors on the pin end, when the protectors are driven over the pipe, the threads of the pipe will tend to shear and remove the top of the ribs but still there will be the deformation of the geometric shape between the ribs which will cause the protectors to form a tight fit. The cold will cause the plastic to be more brittle and less deformable. The threads will not bite into or form indentations into the ribs to an appreciable extent. If, on the other hand, the protectors are applied in hot weather, the protectors will be expanded. The threads will not remove any material from the ribs as they are going on because there will not be enough pressure between the protector and the ribs. However, the protector will be geometrically deformed between the ribs and there will be more deforming of the material by the threads making more indentations in the material. The warmer the plastic the easier it is for the threads to bite into or make indentations in the ribs. In either event, the shape of the protector will be deformed to such an extent that the sleeve of the protector between the ribs will be near the threads if not in acutal contact with the threads between the ribs.

(2) Objects of this Invention

An object of this invention is to protect the threads upon the end of a pipe.

Another object of this invention is to prevent foreign material from entering the pipe.

Further objects are to achieve the above with a device that is sturdy, compact, durable, lightweight, simple, safe, efficient, versatile, ecologically compatible, energy conserving, and reliable, yet inexpensive and easy to manufacture, and install.

Other objects are to achieve the above with a method that is versatile, ecologically compatible, energy conserving, rapid, efficient, and inexpensive, and does not require skilled people to install.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIGS. 1 and 2 are perspective view of a deformable pipe thread protector made in accordance with the present invention;

FIGS. 3 and 4 are opposed end views of the pipe thread protector disclosed in FIGS. 1 and 2;

FIG. 5 is a side elevational view of the apparatus disclosed in the foregoing figures, with some parts thereof being removed therefrom and some of the remaining parts being shown in cross section;

FIG. 6 is a fragmentary, part cross sectional representation, taken along line 6—6 of FIG. 5;

DETAILED DESCRIPTION OF THE PREFERRED EMBODIMENTS

Figure 7:
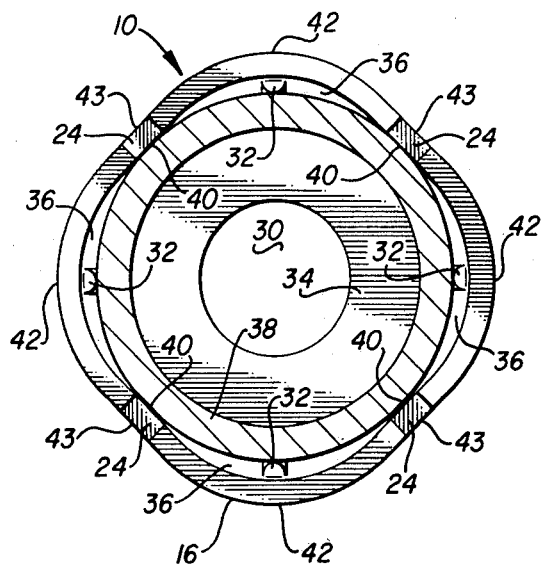
FIG. 7 is a lateral, cross sectional view showing the apparatus disclosed in the foregoing figures in operative relationship respective to a joint of pipe.

In the various figures of the drawings, and in particular FIGS. 1-6, there is disclosed a deformable pipe thread protector apparatus 10 made of resilient material, e.g., PVC, Styrene, high density polyethylene, and various other plastics and rubber like compositions having good weathering properties. The pipe thread protector includes a small diameter end 12 opposed to a large diameter end 14. The opposed ends are generally described by spaced planes which are disposed parallel to one another and perpendicular to the longitudinal axial centerline of the apparatus.

The protector is generally a cylindrical sleeve in form and inwardly tapers from the large toward the small diameter end and, therefore, is representative of a frustum of a cone.

The marginal large diameter end is in the form of a continuous circumferentially outward extending shoulder 16 which continues toward the small diameter end portion in the form of radially spaced outwardly directed ribs 18. Hence the ribs and the shoulder can be said to result from the removal of material in an area defined by two adjacent spaced apart ribs together with the intermediate edge of the shoulder. The ribs continue towards the reduced diameter end of the protector and at numeral 20 the ribs lose their identity and become a part of a circumferentially extending marginal small diameter end thereof.

Radially spaced apart lugs 22 are located on an imaginary circle which is of smaller diameter respective to the reduced diameter end of the apparatus. The lugs facilitate removal of the protector from a pipe end. Cut-outs 24 are formed on the opposed end of the protector. The cut-outs are radially spaced from one another and located within the marginal end portion of shoulder 16.

Numeral 26 indicates the marginal inside peripheral wall surface which is opposed to the shoulder 16, while numeral 28 indicates a bulkhead located at the small diameter end of the apparatus. The bulkhead is apertured as indicated by numeral 30, thereby providing a lightening hole and enabling the interior of a pipe to breathe.

Rib 32 is an integral part of the apparatus and extends inwardly from the inside wall surface in opposition to the outer ribs 18. Numeral 34 indicates the inner wall surface of the bulkhead. The ribs commence at wall surface 34 and terminate at 35 in spaced relationship to the large diameter end such that the before mentioned marginal wall surface 26 is provided.

Accordingly, there is an inside wall surface 26 which is uninterrupted by ribs which continue as another wall surface 36 located between the spaced ribs. Numeral 37 indicates the joinder area between the ribs 18 and the intermediate edge of shoulder 16.

Figure 9:
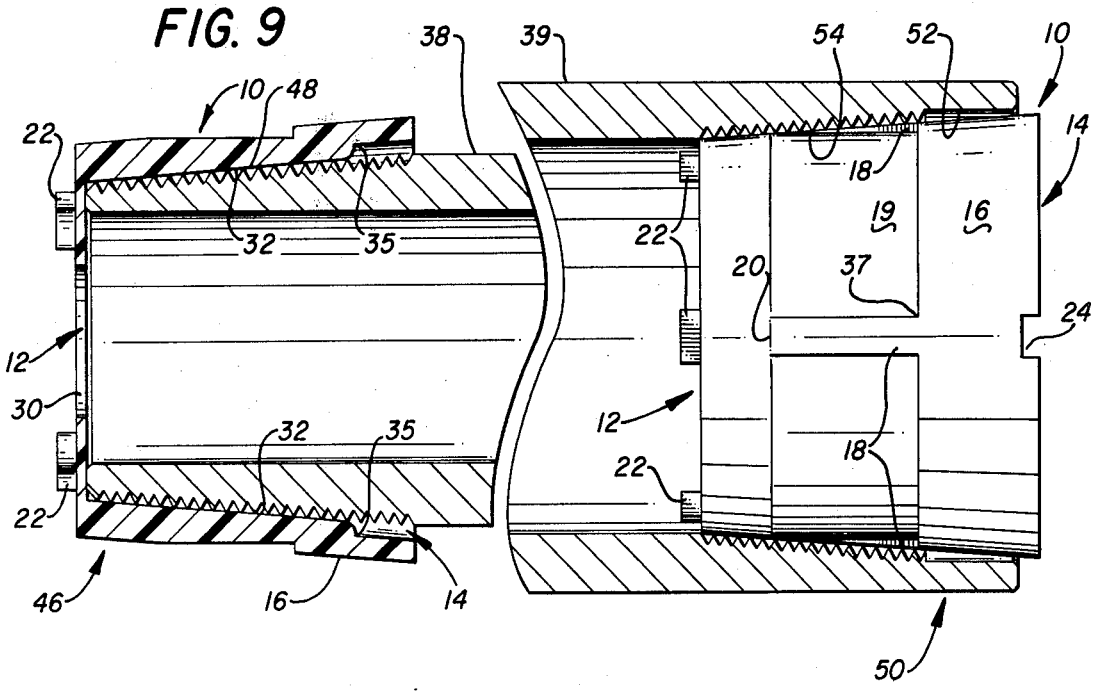
FIG. 9 is a longitudinal sectional representation illustrating the pipe thread protector apparatus of FIG. 1 in operative relationship with various different marginal threaded ends of pipe.
Figure 10:
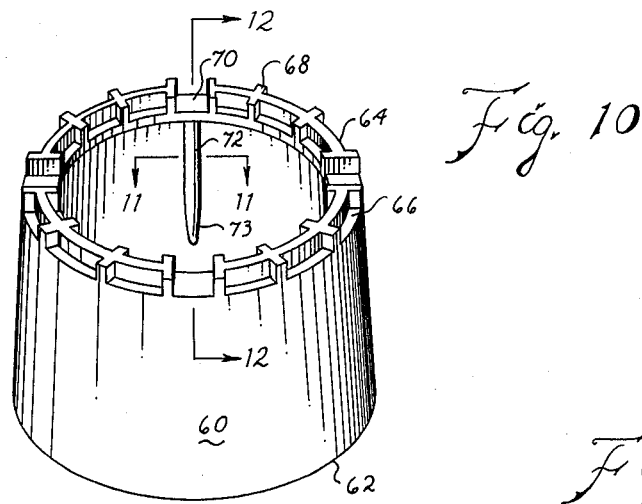
FIG. 10 is a perspective view of a second embodiment of a deformable pipe thread protector.

FIGS. 7 and 9 illustrate the pipe protector operatively affixed to the pin end of a metal pipe 38. Pipes 38 and 39 are of different diameters and it will be noted that the protector 10 is used on either of the pipe ends.

Figure 8:
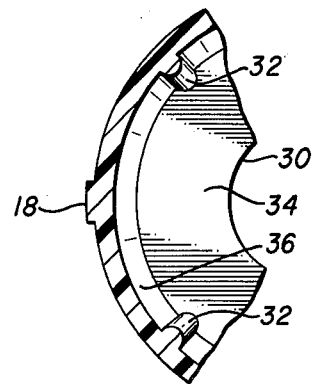
FIG. 8 is a fragmentary, part cross sectional representation, taken along line 8—8 of FIG. 5.

As seen in FIG. 7, the ribs 32 force the cylindrical sidewall of the protector radially away from the pipe threads while the inner wall surface located between adjacent ribs contact the pipe threads as indicated by numeral 40. Accordingly, the protector of the present invention is distorted from the circular or round configuration as seen illustrated in FIG. 8, e.g., into the oblated configuration as seen in FIGS. 7 and 9.

The geometry of the distorted protector depends upon the number of ribs employed, and in the preferred embodiment of the present invention, there are disclosed four ribs. Accordingly, the resulting oblated geometrical configuration is related to a four sided figure having corners 42 and sides 43, with there being a side located between each adjacent inner rib.

Numeral 46 generally indicates the pin end of a two and three-eighths EVE eight round tubing or pipe, having a marginal threaded end 48 placed into engagement with the inner ribs of the protector such that the protector is deformed into the configuration illustrated in FIG. 7.

Numeral 50 generally illustrates the box end of an upset oil string, such as two and seven-eighths EVE eight round tubing. Upset tubing usually is provided with a circumferentially extending shoulder at 52 and tapered threads 54 which commence at the inner end of the shoulder and extend towards the interior of the pipe. It will be noted that shoulder 16 of the protector is seated within the pipe shoulder while the ribs 18 engage the threads 54 with sufficient force to deform the intervening sidewalls in a manner analogous to FIGS. 7 and 8.

Referring to the drawings, and particularly FIG. 9, it may be seen that the pipe threads, both on the pin end of pipe 38 and the box end of pipe 39, are tapered, i.e., the surface extends toward a common point located along the longitudinal axis thereof. Not only are the ribs tapered as described above, but the ribs have the same taper as the pipe threads as clearly seen in FIG. 9. Furthermore, as seen in FIG. 9, the threads have a tip diameter which extends away from the pipe and a root diameter which is cut into the pipe. Both the pin and box end have a tip and root diameter. The ribs obviously contact the tip of the threads at the tip diameter. However, in the method according to this invention, the sleeve of the protector is telescoped along the pipe to a point where the undeformed defector would have a "rib diameter" or the distance between the ribs at any point of contact with the threads more nearly the root diameter of the threads than the tip diameter of the threads. Thus, the telescoping of the protector along the tapered threads produces the oblate shape. Further it may be seen by having the rib taper equal to the thread taper that the ribs will contact the threads with uniform pressure throughout the contact therebetween.

The pipe protector of the present invention preferably is placed with the large diameter end encompassing the outer threaded pin end 46 of the tubing, and is driven into place with a mallet or wooden two-by-four. This causes the protector to telescopingly engage the marginal threaded end of the pipe with sufficient force to be deformed into the configuration illustrated in FIG. 7. The memory of the plastic causes the ribs to be inwardly biased against the pipe threads with sufficient force to hold the protector in place until it is desired to remove the protector from the pipe. The protector can be fitted to the pin end of a two and three-eighths inch pipe or to the box end of a two and seven-eighths inch pipe, and accordingly; one protector suffices for two different size pipe ends thereby eliminating fifty percent of a pipe protector inventory.

The protector is removed by engaging the lugs 22 with any suitable elongated apparatus, e.g., a large screw driver, thereby enabling the protector to be unscrewed. The protector is reusable until the ribs have become appreciative worn from usage.

The protector is placed on the box end of the larger pipe in the illustrated manner of FIG. 9 by driving the protector into place with a mallet or wooden two-by-four so that the shoulder 52 of the pipe "shoulders up" with the shoulder 16 of the protector. Simultaneously, the outer ribs engage the threads of the pipe with sufficient force to deform the protector in a manner similar to FIG. 7 wherein the outer ribs thereof are inwardly deformed to provide for the oblated configuration. The protector is removed from the box end by engaging the lugs 24 with a suitably sized screw driver or similar elongated piece of metal.

The present invention provides a protector for use on two different size pipes, wherein the outer or inner ribs engage the threaded pipe surface, while shoulder 16 or bulkhead 28 enables proper positioning of the apparatus. The staggered relationship of the outer and inner ribs, together with the opposed marginal ends 16 and 20, provide the unexpected advantage of a protector which resiliently mates with a pipe end in an improved and superior manner. The method of jointly using the ribs and memory of the plastic to provide a protector which is resiliently distorted from a circular into an oblated geometrical configuration provides a new protector having advantages not found in the prior art.

Specifically, because such a large portion of the sleeve of the protector is distorted, it is capable of retaining firm contact with the pipe as a result of expansion and contraction due to temperature changes as discussed above in the Background of the Invention.

Another unexpected and unusual attribute of the ribs and shoulder combination of this invention lies in the cooperative action of the protectors as two adjacent pipe joints make rolling contact with one another. In such an instance, the shoulder 16 and small diameter marginal end of the protector make low friction engagement thereby preventing the ribs 18 of the two protectors from contacting one another. This action prevents the protectors from being inadvertently unscrewed from the pipe ends.

The deformation of the protector from a round into an oblated configuration avoids undue stresses and breakage of the wall structure as the apparatus is driven onto the end of a pipe.

Referring more particularly to the embodiment shown in FIGS. 10-13, there may be seen a thread protector for the external threads of a pipe.

The protector has a sleeve like body 60. As seen in the drawings, sleeve 60 has a slight taper to it. This taper is no greater than the taper of the threads upon the end of the pipe. The pipe threads will generally have a taper of 1:16, although in some cases they will have a taper of 1:32. I would prefer the sleeve 60 to be cylindrical, however, in the manufacture of plastic parts it is difficult to form a cylindrical sleeve and, therefore, a small taper is included with it. Preferably, the taper is as small as possible. The sleeve has open end 62 and shoulder end 64. If the sleeve 60 has any taper at all the shoulder end 64 will be at the smaller end and open end 62 at the larger end.

A shoulder, in the form of inwardly extending flange 66, is formed at the shoulder end. The shoulder has raised lugs 68. The lugs are in the form of reinforced projections. They provide diametrically opposed slots 70 by which a tool may be used to rotate the protector to remove the protector from a pipe. In the event it is desired to protect the bore of the pipe from dirt or other contaminants, the shoulder 66 may extend all the way across the protector forming a closed end to thereby protect the bore of the pipe from the entry of dirt and the like.

Figure 11:
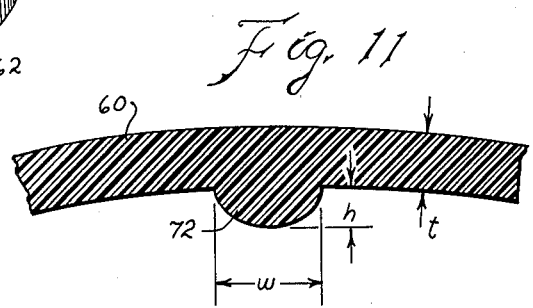
FIG. 11 is a sectional view of a portion thereof showing the particular shape of the ribs set therein taken substantially on line 11—11 of FIG. 10.

Four longitudinal ribs 72 are located within the sleeve 60. The ribs 72 run for their full height from the shoulder 66 to a point which is about ⅓ the length of the sleeve. Thereafter, the ribs taper at 73 into the sleeve so that ⅓ of the sleeve next to open end 62 is smooth and unribbed. I.e., the sleeve is divided into thirds. The third next to the open end is smooth and has no ribs. The middle third has the tapered rib 73. The third next to the shoulder has the ribs 72 at full height. As shown in the drawing, the ribs 72 will have a certain height "h" and certain width "w". Normally, the width "w" of the ribs will be over twice the height "h" of the ribs. The ribs will normally be curved in cross section as seen in FIG. 11. Normally, the ribs will not have a greater height "h" than the thickness "t" of the sleeve 60.

It is desired that the sleeve 60 have as little taper as possible and no greater taper than the pipe threads of which the sleeve is to protect. Likewise, the ribs 72 should have as little taper as possible and in no event have a greater taper than the pipe threads which they protect. As explained above, the sleeve of the protector will be distorted from its normal circular configuration into an oblate configuration, the same as the previous embodiment, as illustrated in FIG. 7. However, the shoulder 66 at the shoulder end 64 makes it difficult to distort the sleeve at that end. Therefore, it is more desirable to have the sleeve distorted in the mid part of the sleeve, i.e., between the shoulder end 64 and the open end 62. The open end 62 will be only slightly larger than the unthreaded pipe itself. Therefore, any distortion of the sleeve at the open end brings the sleeve into contact with the unthreaded portion of the pipe and, therefore, the sleeve will not be greatly distorted in this area. On the other hand, distortion at the shoulder end 64 is more difficult and will sometimes result in cracking or breaking of the sleeve beginning at the shoulder which is undesirable. However, in the mid section of the sleeve well away from the ends 62 and 64, the sleeve can readily be distorted. Of course, the distortion of the sleeve is highly desirable between the two ends and is a sought after feature of the invention. Therefore, it is desirable that the ribs 72 have a lesser taper than the threads which they engage so that this desired distortion pattern is achieved.

Figure 12:
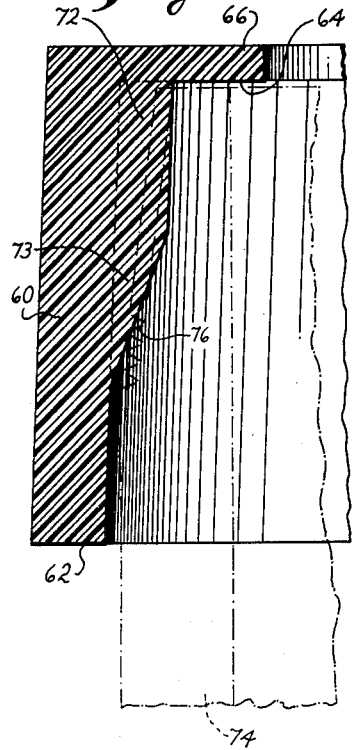
FIG. 12 is a sectional view taken longitudinally through the rib taken substantially on line 12—12 of FIG. 10 with the pipe outline shown in phantom line thereon. The thickness and taper of the elements has been greatly exaggerated for the purposes of clarity of illustration.

FIG. 12 illustrates the sleeve in connection with short pipe 74. The pipe is called a short pipe because it is threaded by short threads 76, the pipe being only threaded about ⅔'s the length of the sleeve. I.e., the pipe threads begin at about the same point taper ribs 73 begin. It may be seen that with the ribs 72 having a less taper than the pipe threads that the maximum interference between the ribs 72 and the pipe threads 76 is in the area located about ⅓ of the way from the shoulder end.

Figure 13:
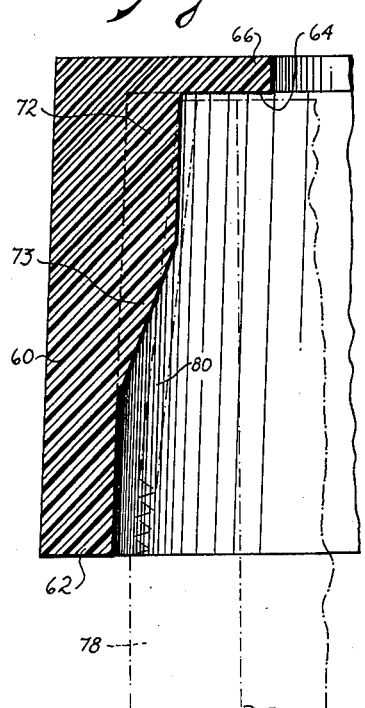
FIG. 13 is a sectional view taken substantially similar to FIG. 12 showing another pipe outline in phantom lines thereon. The thickness and taper of the elements has been greatly exaggerated for the purposes of clarity of illustration.

FIG. 13 illustrates the protector in use with long pipe 78 called a long pipe because it has long threads 80. I.e., the threads extend for approximately the full length of the sleeve 60. Even so, it may be seen that the maximum contact or interference between the threads and the ribs is located about ⅓ of the way from the shoulder end.

This relation can also be expressed that the diametrical distance between the ribs is less than the diameter of the threads at a point between the ends of the sleeve when the sleeve is fully telescoped over the pipe. Also, the thread diameter will exceed the distance between the ribs by a greater amount between the ends of the sleeve than at either end of the sleeve. As illustrated in FIGS. 12 and 13, this point where the thread diameter exceeds the distance between the ribs will be a point ⅓ the distance from the shoulder end. Of course, this difference between the thread diameter and the distance between the ribs will cause the sleeve to deform from a circular to an oblate configuration and this deformation will be between the ends of the sleeve.

It will be emphasized that FIGS. 11, 12 and 13 are not scale drawings and particularly in FIGS. 12 and 13, the thicknesses and the tapers have been exaggerated for the purposes of illustration. Also, the protector is shown in a non-distorted condition. I.e., the protector is shown according to its shape and size at normal temperatures (about 70° F. and 22° C.). The phantom pipe outline is shown also according to what it would be. Therefore, the interference between the ribs and the pipe as shown indicating what the changes and movement necessary of the protector and the location where this change and movement will occur. Of course, it is understood as explained above that the protector does not move fully to the extent of the interference shown in FIGS. 12 and 13 but there is a deformation of the ribs by the threads being indented into the ribs and further that in certain conditions there will be a shaving or that the ribs will be scrapped away when the protector is driven onto the threads.

Also, it will be understood that providing the protector for the external threads is more critical and more difficult than providing the protector for the interior threads. The interior threads are not subjected to the impacts, rough handling, rubbing against other pipes and the like that the external threads are subjected to. Therefore, the protectors for internal threads are much easier to maintain in place than the protectors for the external threads.

The ribs themselves may be thought of as stress bars. I.e., it is the ribs which produce the tensions, stresses and strains which produce the distortion of the protector.

Thus it may be seen that I have provided for a protector for pipe threads which has as its basic principle the basic change in shape of the protector from its original circular configuration into that oblate configuration when it is placed upon the pipe.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A deformable pipe thread protector comprising:
   a. a hollow body member in a form of a sleeve having a central longitudinal axis and opposed ends formed by spaced planes which are perpendicular to the longitudinal axis;

b. a circumferentially outwardly extending shoulder at the marginal large diameter end, radially spaced outer ribs which are a continuation of said shoulder and which terminate in spaced relationship respective to the small diameter marginal end;

c. said ribs lie along an imaginary line which intersect at a common point located on the longitudinal axis at a location spaced from said protector apparatus.

2. The invention as defined in claim 1 further comprising:
a bulkhead formed at said small diameter end which is parallel to each of the planes which form said opposed ends.

3. The invention as defined in claim 1 further comprising:
a plurality of inwardly directed spaced inner ribs which commence at said small diameter end and terminate in spaced relationship respective to said large diameter end, thereby leaving a circumferentially extending marginal wall area opposed to said shoulder.

4. The invention as defined in claim 3 wherein said inner and outer ribs extend in opposition to one another and are circumferentially spaced apart from one another in staggered relationship about said body member.

5. The invention as defined in claim 1 wherein
d. a bulkhead is formed at said small diameter end which is parallel to each of the recited planes which form said opposed ends;
e. a plurality of inwardly directed, spaced apart, inner ribs which commence at said bulkhead and terminate in spaced relationship respective to said large diameter end;
f. said inner and outer ribs extend in opposition to one another, are circumferentially spaced from one another about said body member, and form an integral part of said body member;
g. said outer ribs diminish in thickness in a direction toward said small diameter end whereby the marginal small diameter end is uninterrupted by said outer ribs so that said outer ribs extend only in the medial portion of said body.

6. The invention as defined in claim 1 wherein said ribs are formed by spaced rectangular voids, with the voids being formed into the outer surface of said body member such that the voids have an upper, lower, and opposed sides, respectively, formed by an edge portion of said shoulder and the edge portion of two adjacent ribs, respectively.

7. A deformable frustoconical pipe thread protector comprising:
a. exterior and opposed large and small diameter ends, which form a frustum of a cone;
b. the marginal large diameter end of the protector having a circumferentially extending continuous shoulder; and
c. a plurality of outwardly directed, radially spaced ribs which are a continuation of said shoulder, which extend towards said small diameter end, and towards a common point located along the longitudinal central axis of the protector such that said ribs diminish in thickness from said shoulder towards said small diameter end.

8. The invention as defined in claim 7 further comprising:
a bulkhead at said small diameter end which is disposed parallel to each of the planes which form said opposed ends.

9. The invention as defined in claim 8 further comprising:
a plurality of inwardly directed, spaced apart, inner ribs which commence at said bulkhead and terminate in spaced relationship respective to said large diameter end.

10. The invention as defined in claim 7 wherein said ribs result from spaced rectangular voids which are formed into the outer surface of said body member such that the voids have upper, lower and opposed sides, respectively, formed by an edge portion of said shoulder and two adjacent ribs, respectively.

11. In a pipe protector for a pipe having
a. external threads at one end,
b. the threads having a thread taper, and
c. the threads having a thread length;
the improvement comprising:
d. a sleeve having
(i) a shoulder end, and
(ii) an open end, and
(iii) no greater taper from the open end to the shoulder end than the thread taper, and
e. longitudinal internal ribs extending for a portion of the length of the sleeve,
f. the sleeve being unribbed next to the open end,
g. the ribs near the shoulder end having no greater taper than the thread taper.

12. The invention as defined in claim 11 further comprising:
h. said sleeve having a length at least equal to said thread length.

13. The invention as defined in claim 11 wherein
h. said protector is telescoped over the threads.

14. The invention as defined in claim 11 further comprising:
h. said ribs having a diametrical distance between them of less than the diameter of the threads at a point between the ends of the sleeve when the sleeve is fully telescoped over the pipe threads so that the sleeve is deformed from a circular to an oblate configuration.

15. The invention as defined in claim 14 further comprising:
j. the thread diameter exceeding the distance between the ribs by a greater amount between the ends of the sleeve than at either end of the sleeve.

16. The invention as defined in claim 15 wherein said protector is telescoped over the threads.

17. The invention as defined in claim 16 further comprising:
k. said sleeve having a length at least equal to said thread length.

* * * * *